(12) United States Patent
Kurita et al.

(10) Patent No.: US 12,294,553 B2
(45) Date of Patent: May 6, 2025

(54) TERMINAL PERFORMING INITIAL ACCESS

(71) Applicant: NTT DOCOMO, INC., Tokyo (JP)

(72) Inventors: Daisuke Kurita, Tokyo (JP); Hiroki Harada, Tokyo (JP); Tomoya Ohara, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 345 days.

(21) Appl. No.: 17/755,125

(22) PCT Filed: Oct. 25, 2019

(86) PCT No.: PCT/JP2019/042071
§ 371 (c)(1),
(2) Date: Apr. 21, 2022

(87) PCT Pub. No.: WO2021/079529
PCT Pub. Date: Apr. 29, 2021

(65) Prior Publication Data
US 2022/0376878 A1    Nov. 24, 2022

(51) Int. Cl.
*H04L 5/00* (2006.01)
*H04L 27/26* (2006.01)
*H04W 74/0833* (2024.01)

(52) U.S. Cl.
CPC .......... *H04L 5/0092* (2013.01); *H04L 5/0078* (2013.01); *H04L 27/26025* (2021.01); *H04W 74/0841* (2013.01)

(58) Field of Classification Search
CPC ................. H04L 5/0092; H04L 5/0078; H04L 27/26025; H04W 74/0841
See application file for complete search history.

(56) References Cited

U.S. PATENT DOCUMENTS

| | | | | |
|---|---|---|---|---|
| 2019/0132882 A1* | 5/2019 | Li | ...................... | H04W 74/0833 |
| 2019/0223228 A1* | 7/2019 | Ko | ...................... | H04W 74/0891 |
| 2019/0306832 A1* | 10/2019 | Si | .......................... | H04L 5/0082 |
| 2022/0353939 A1* | 11/2022 | Lei | ......................... | H04L 1/1825 |
| 2023/0219017 A1* | 7/2023 | Yoo | ........................ | H04L 5/0053 |
| | | | | 370/329 |

OTHER PUBLICATIONS

3GPP TS 38.211 V15.7.0 "3rd Generation Partnership Project; Technical Specification Group Radio Access Network; NR; Physical channels and modulation (Release 15)" Sep. 2019 (97 pages).
3GPP TR 38.807 V0.1.0 "3rd Generation Partnership Project; Technical Specification Group Radio Access Network; Study on requirements for NR beyond 52.6 GHZ (Release 16)" Mar. 2019 (43 pages).

(Continued)

*Primary Examiner* — Chae S Lee
(74) *Attorney, Agent, or Firm* — Osha Bergman Watanabe & Burton LLP

(57) ABSTRACT

In a case of using a different frequency band that is different from a frequency band including one or a plurality of frequency ranges, a terminal applies initial access configurations including a format of an initial access signal, the format being different from that for the frequency band. The terminal transmits the initial access signal via an initial access channel set based on the applied initial access configurations.

4 Claims, 13 Drawing Sheets

(56) References Cited

OTHER PUBLICATIONS

3GPP TSG-RAN WG4 Meeting #90; R4-1901750 "Discussion on the general issues for the 7-24GHz SI" Huawei; Athens, Greece; Feb. 25-Mar. 1, 2019 (3 pages).
International Search Report issued in International Application No. PCT/JP2019/042071, mailed Jul. 14, 2020 (3 pages).
Written Opinion issued in International Application No. PCT/JP2019/042071; Dated Jul. 14, 2020 (4 pages).

* cited by examiner

TERMINAL PERFORMING INITIAL ACCESS

TECHNICAL FIELD

The present invention relates to a terminal that performs radio communication, and more particularly, to a terminal that performs initial access to a network.

BACKGROUND ART

The 3rd Generation Partnership Project (3GPP) specifies Long Term Evolution (LTE), and specification of LTE-Advanced (hereinafter, collectively referred to as LTE, including the LTE-Advanced) for the purpose of further increasing the speed of LTE, and specification of 5th generation mobile communication system (which is also called 5G, New Radio (NP), or Next Generation (NG)) have been conducted.

In Release 15 and Release 16 (NR) of 3GPP, an operation in a band including FR1 (410 MHz to 7.125 GHz) and FR2 (24.25 GHz to 52.6 GHz) is specified. In addition, in the specifications of Release 16 and later, an operation in a band beyond 52.6 GHz is also under study (Non Patent Literature 1). A target frequency range in Study Item (SI) is 52.6 GHz to 114.25 GHz.

In a case where a carrier frequency is very high as described above, the increase of phase noise and propagation loss becomes a problem. Further, it becomes more sensitive to a peak-to-average power ratio (PAPR) and nonlinearity of a power amplifier.

In order to solve such a problem, when using a different frequency band that is different from FR1 and FR2, such as a high frequency band above 52.6 GHz, Cyclic Prefix-Orthogonal Frequency Division Multiplexing (CP-OFDM)/Discrete Fourier Transform-Spread (DFT-S-OFDM) with a larger subcarrier spacing (SCS) may be applied.

CITATION LIST

Non Patent Literature

Non Patent Literature 1: 3GPP TR 38.807 V0.1.0, 3rd Generation Partnership Project; Technical Specification Group Radio Access Network; Study on requirements for NR beyond 52.6 GHz (Release 16), 3GPP, March 2019

SUMMARY OF INVENTION

However, the larger (wider) the SCS, the shorter the OFDM symbol length (the symbol length may also be referred to as a symbol duration). Further, a duration of an SS/PBCH block (SSB) configured with a synchronization signal (SS) and a downlink physical broadcast channel (PBCH) in time domain is decreased similarly.

Therefore, a reachable range of a random access (RA) preamble (hereinafter, simply referred to as an RA preamble or preamble) transmitted in a random access channel (physical random access channel (PRACH)) occasion (RO), that is, a coverage is also decreased due to a propagation delay of the RA preamble in a cell, which is problematic.

Further, as the SCS becomes large, a length of the RA preamble becomes short. Therefore, a cyclic shift amount is limited, which causes a reduction of the number of patterns of the preamble and PRACH power spectral density (PSD).

In this regard, the present invention has been made in view of such a situation, and an object of the present invention is to provide a terminal capable of reliably performing initial access such as an appropriate random access (RA) procedure even in a case of using a different frequency band that is different from FR1/FR2.

An aspect of the present disclosure is a terminal (UE 200) including: a control unit (control unit 270) that applies, in a case of using a different frequency band (for example, FR4) that is different from a frequency band including one or a plurality of frequency ranges (FR1 and FR2), initial access configurations including a format of an initial access signal (RA preamble), the format being different from that for the frequency band; and a transmitting unit (control signal/reference signal processing unit 240) that transmits the initial access signal via an initial access channel (PRACH) set based on the initial access configurations.

DESCRIPTION OF EMBODIMENTS

Figure 1:
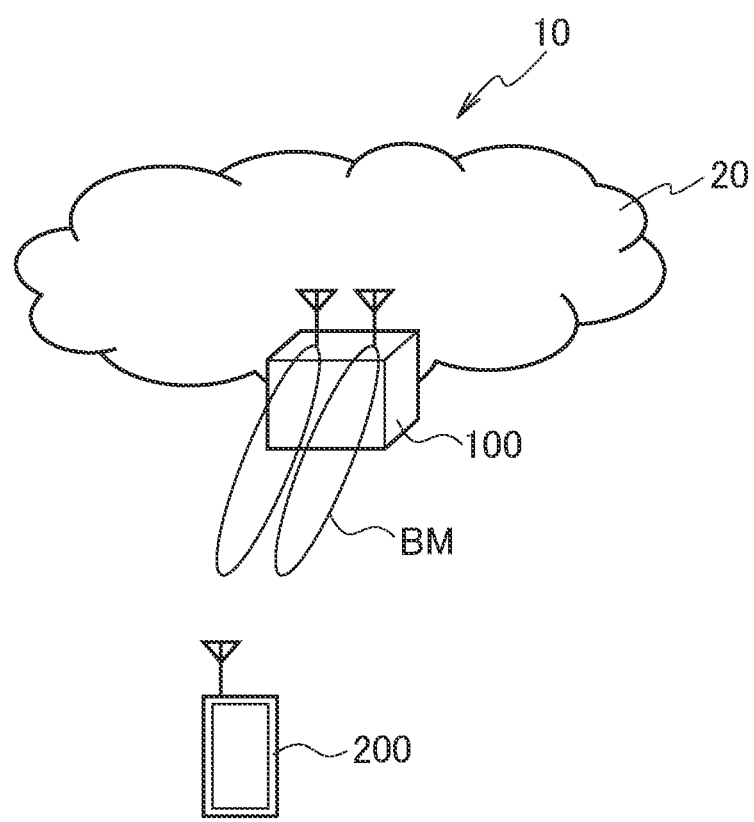
FIG. 1 is an overall schematic configuration diagram of a radio communication system 10.

Hereinafter, embodiments will be described with reference to the drawings. Note that the same functions or configurations are denoted by the same or similar reference numerals, and description thereof is omitted as appropriate.

(1) OVERALL SCHEMATIC CONFIGURATION OF RADIO COMMUNICATION SYSTEM

FIG. 1 is an overall schematic configuration diagram of a radio communication system 10 according to the present embodiment. The radio communication system 10 is a radio communication system according to 5G New Radio (NR), and includes a Next Generation-Radio Access Network 20

(hereinafter, referred to as an NG-RAN 20) and a terminal 200 (hereinafter, referred to as a user equipment (UE) 200).

The NG-RAN 20 includes a radio base station 100 (hereinafter, referred to as a gNB 100). Note that a specific configuration of the radio communication system 10 such as the number of gNBs or the number of UEs is not limited to the example illustrated in FIG. 1.

The NG-RAN 20 actually includes a plurality of NG-RAN nodes, specifically, gNBs (or ng-eNBs), and is connected to a core network (5GC) (not illustrated) according to 5G. Note that the NG-RAN 20 and the 5GC may be simply referred to as a "network".

The gNB 100 is a radio base station according to 5G, and performs radio communication with the UE 200 according to 5G. The gNB 100 and the UE 200 can support massive Multiple-Input Multiple-Output (MIMO) in which a beam BM with higher directivity is formed by controlling a radio signal transmitted from a plurality of antenna elements, carrier aggregation (CA) in which a plurality of component carriers (CC) are used in bundles, Dual Connectivity (DC) in which communication is performed between the UE and each of two NG-RAN nodes at the same time, and the like.

Figure 2:
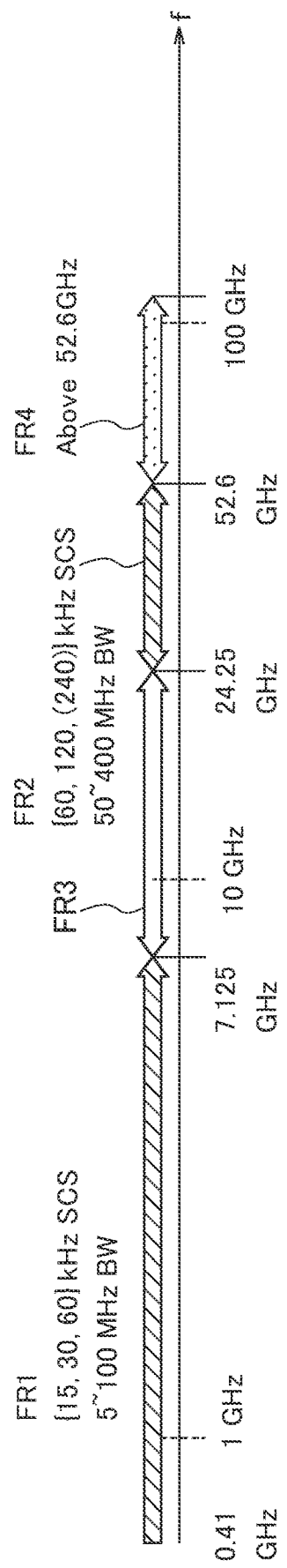
FIG. 2 is a diagram illustrating frequency ranges used in the radio communication system 10.

Further, the radio communication system 10 supports a plurality of frequency ranges (FR). FIG. 2 illustrates frequency ranges used in the radio communication system 10.

As illustrated in FIG. 2, the radio communication system 10 supports FR1 and FR2. A frequency band of each FR is as follows.

FR1: 410 MHz to 7.125 GHz
FR2: 24.25 GHz to 52.6 GHz

In FR1, a subcarrier spacing (SCS) of 15 kHz, 30 kHz or 60 kHz is used, and a bandwidth (BW) of 5 to 100 MHz is used. FR2 is a higher frequency range than FR1, and in FR2, an SCS of 60 kHz or 120 kHz (240 kHz may be included) is used, and a bandwidth (BW) of 50 to 400 MHz is used.

Note that the SCS may be interpreted as numerology. The numerology is defined in 3GPP TS38.300 and corresponds to one subcarrier spacing in frequency domain.

Furthermore, the radio communication system 10 also supports a higher frequency band than the frequency band of FR2. Specifically, the radio communication system 10 supports a frequency band beyond 52.6 GHz and up to 114.25 GHz. Here, such a high frequency band is referred to as "FR4" for convenience. FR4 belongs to so-called extremely high frequency (EHF, also called millimeter wave). Note that FR4 is a tentative name and may be called by another name.

In addition, FR4 may be further divided. For example, FR4 may be divided into a frequency range of 70 GHz or lower and a frequency range of 70 GHz or higher. Alternative FR4 may be divided into a larger number of frequency ranges, or may be divided into frequency ranges based on a frequency other than 70 GHz.

Further, here, a frequency band between FR1 and FR2 is referred to as "FR3" for convenience. FR3 is a frequency band beyond 7.125 GHz and below 24.26 GHz.

In the present embodiment, FR3 and FR4 are different from the frequency bands including FR1 and FR2, and are called different frequency bands.

Particularly, in a high frequency band such as FR4, there is problem such as an increase, of phase noise between carriers as described above. Therefore, application of a larger (wider) subcarrier spacing (SCS) or a single carrier waveform can be required.

In addition, since it becomes more sensitive to a peak-to-average power ratio (PAPR) and nonlinearity of power amplifier, a larger (wider) SCS (and/or fewer fast Fourier transform (FFT) points), a PAPR reduction mechanism, or a single carrier waveform can be required.

In the present embodiment, in a case of using a band beyond 52.6 GHz, Cyclic Prefix-Orthogonal Frequency Division Multiplexing (CP-OFDM)/Discrete Fourier Transform-Spread (DFT-S-OFDM) with a larger SCS may be applied. The DFT-S-OFDM may be applied to downlink (DL) as well as uplink (UL).

Figure 3:
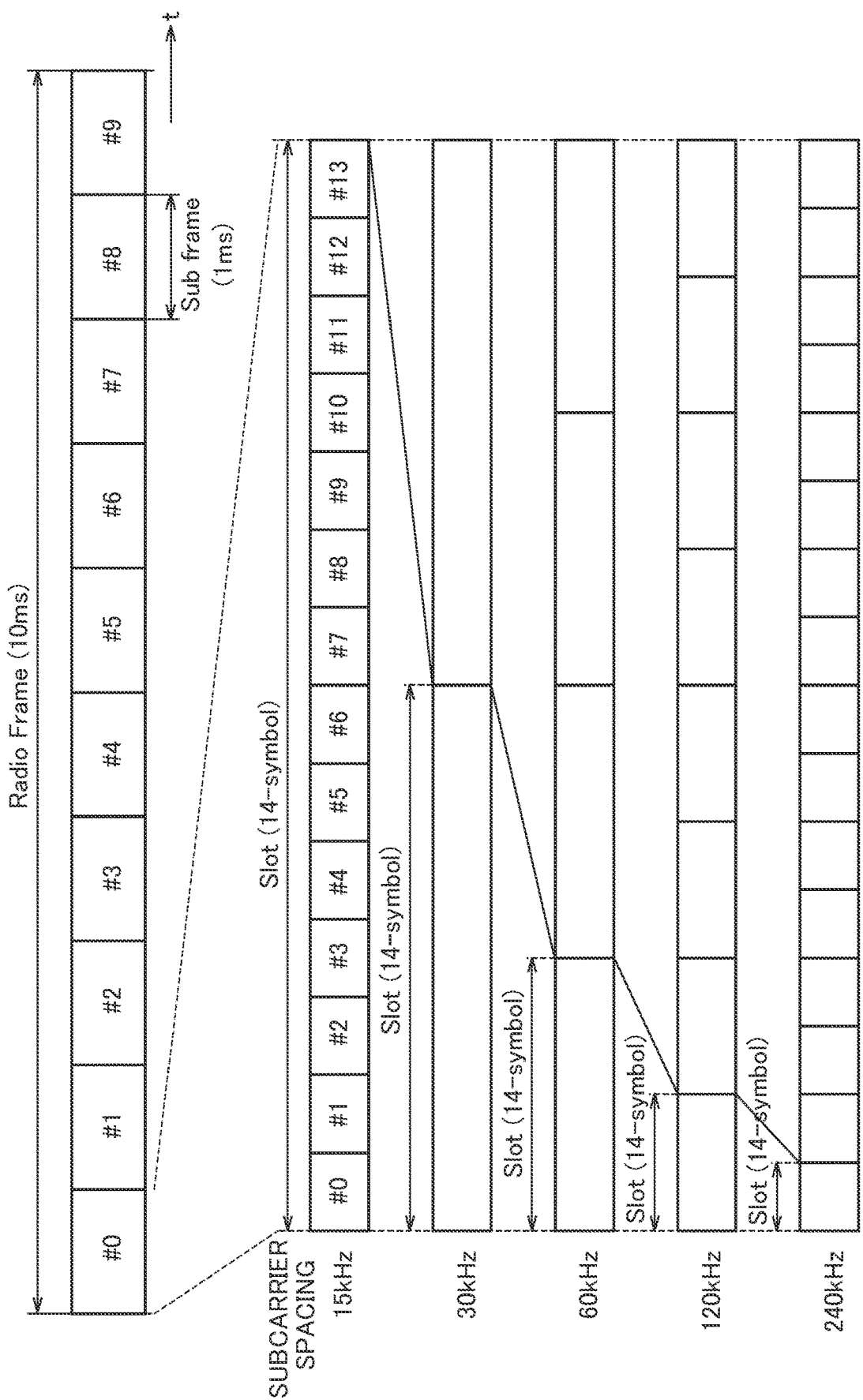
FIG. 3 is a diagram illustrating a configuration example of a radio frame, a subframe, and a slot used in the radio communication system 10.

FIG. 3 illustrates a configuration example of a radio frame, a subframe, and a slot used in the radio communication system 10. Further, Table 1 shows a relationship between an SCS and a symbol duration.

TABLE 1

| | SCS | | | | | | |
|---|---|---|---|---|---|---|---|
| | 15 kHz | 30 kHz | 60 kHz | 120 kHz | 240 kHz | 480 kHz | 960 kHz |
| Symbol Period (unit: µs) | 66.6 | 33.3 | 16.65 | 8.325 | 4.1625 | 2.08125 | 1.040625 |

As illustrated in FIG. 3 and shown in Table 1, the larger (wider) the SCS, the shorter the symbol duration (and the slot duration). The symbol duration may be referred to as a symbol time, a symbol length, or the like, and the SCS may be referred to as a resource block (RB) (including physical RB (PRB)) in a broad sense.

Further, a duration of an SS/PBCH Block (SSB) in the time domain is also decreased similarly. Note that although an SCS up to 960 kHz is shown in Table 1, it is assumed that an SCS of 1920 kHz may also be used, as will be described later.

Further, when supporting FR4 (high frequency band) or the like, in order to cope with a wide bandwidth and a large propagation loss, it is necessary to form a narrower beam by using a massive antenna including a large number of antenna elements. That is, multiple beams are required to cover a certain geographical area.

The SSB is a synchronization signal/broadcast channel block configured with a synchronization signal (SS) and a physical broadcast channel (PBCH). Mainly, the SSB is periodically transmitted to perform detection of a cell ID or reception timing when the UE 200 starts communication. In 5G, the SSB is also used for measurement of reception quality of each cell.

The SS is configured with a primary synchronization signal (PSS) and a secondary synchronization signal (SSS).

The PSS is a known signal that the UE 200 first attempts to detect in a cell search procedure. The SSS is a known signal transmitted to detect a physical cell ID in the cell search procedure.

The PBCH includes information required for the UE 200 to establish frame synchronization with an NR cell formed by the gNB 100 after detecting the SS/PBCH block, such as a radio frame number (system frame number (SFN)) and indexes for identifying symbol positions of plurality of SS/PBCH blocks in a half frame (5 milliseconds).

Further, the PBCH can also include a system parameter required to receive system information (SIB). Further, the SSB also includes a broadcast channel demodulation reference signal (DMRS for PBCH). The DMRS for PBCH is a known signal transmitted to measure a radio channel state for PBCH demodulation.

The UE 200 assumes that each SSB is associated with a beam BM with a different transmission direction (coverage). As a result, the UE 200 residing in the NR cell can receive any beam BM, acquire the SSB, and start initial access and SSB detection/measurement.

Note that a transmission pattern of the SSB varies depending on the SCS, the frequency range (FR), or other parameters. Further, not all SSBs are necessarily transmitted. Only a small number of SSBs may be selectively transmitted according to a requirement, a state, or the like of the network, and the UE 200 may be notified of which SSB is transmitted, and which SSB is not transmitted.

A transmission occasion (PRACH occasion (RO), which may be simply referred to as an occasion) of one or a plurality of physical random access channels (PRACHs) associated with the SS/PBCH block (SSB) is provided to the UE 200.

In 3GPP Release 15, 64 random access (RA) preambles are defined in an RO in time and frequency directions. The RA preambles are enumerated in increasing order of first increasing cyclic shift of logical root sequence, and then in increasing order of a logical root sequence index, starting with an index (prach-RootSequenceIndex) obtained from a higher layer.

A preamble sequence is based on a Zadoff-Chu-based sequence. In a case where 64 RA preambles cannot be generated from a single root Zadoff-Chu sequence, additional preamble sequences are obtained from root sequences with consecutive logical indexes until all the 64 sequences are found. The logical root sequence order is cyclic, and a logical index 0 is consecutive to 837 in a case where $L_{RA}=839$, and is consecutive to 137 in a case where $L_{RA}=139$. A sequence number is obtained from a logical root sequence index according to Tables 6.3.3.1-3 and 6.3.3.1-4 of TS 38.211.

Note that, in the present embodiment, the number of RA preambles per RO can be decreased from 64, as will be described later.

(2) FUNCTIONAL BLOCK CONFIGURATION OF RADIO COMMUNICATION SYSTEM

Next, a functional block configuration of the radio communication system 10 will be described. Specifically, a functional block configuration of the UE 200 will be described.

Figure 4:
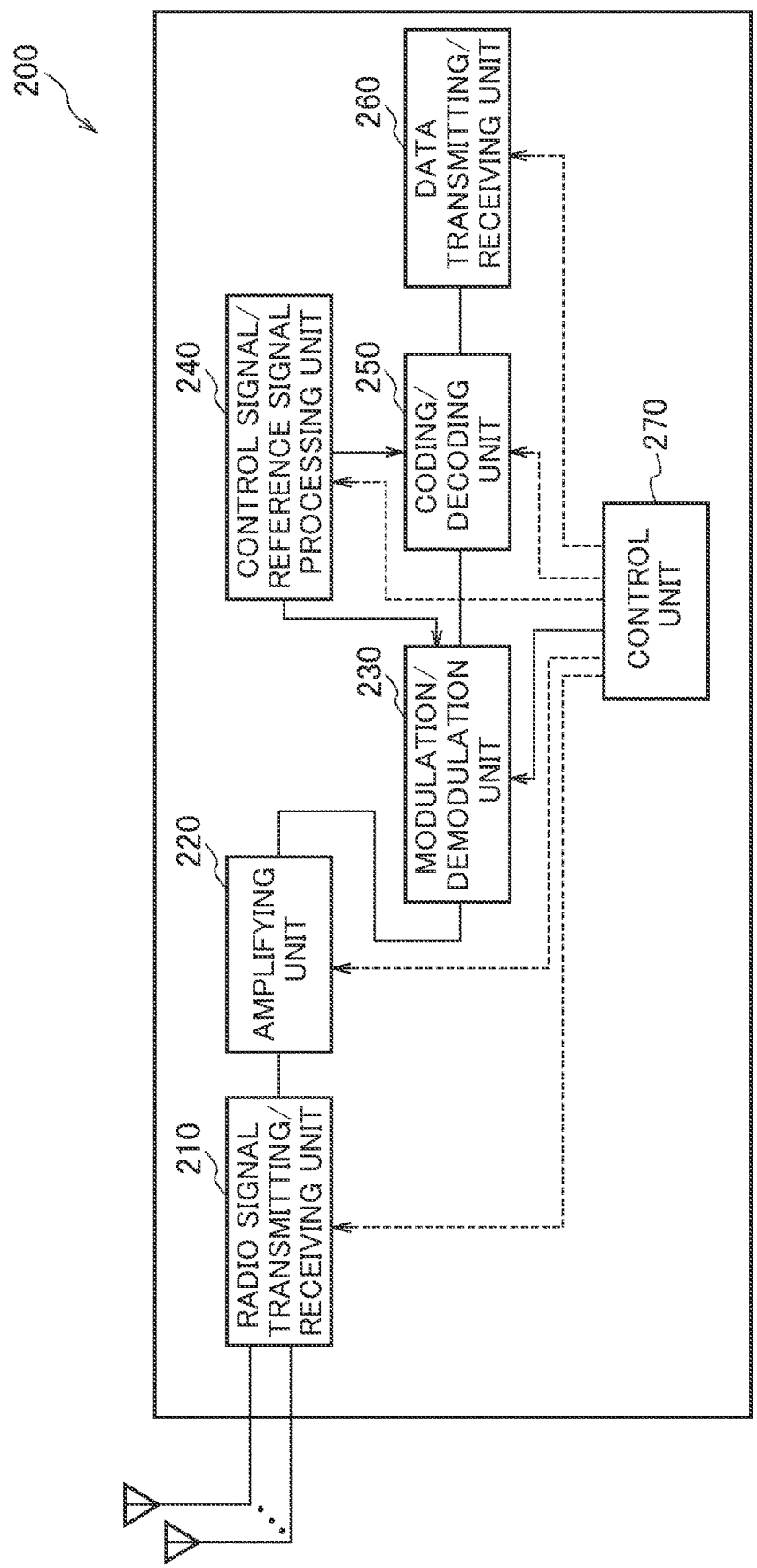
FIG. 4 is a functional block configuration diagram of a user equipment (UE) 200.

FIG. 4 is a functional block configuration diagram of a user equipment (UE) 200. As illustrated in FIG. 4, the UE 200 includes a radio signal transmitting/receiving unit 210, an amplifying unit 220, a modulation/demodulation unit 230, a control signal/reference signal processing unit 240, a coding/decoding unit 250, a data transmitting/receiving unit 260, and a control unit 270.

The radio signal transmitting/receiving unit 210 transmits/receives a radio signal according to NR. The radio signal transmitting/receiving unit 210 supports massive Multiple-Input and Multiple-Output (MIMO), carrier aggregation (CA) in which a plurality of component carriers (CC) are used in bundles, Dual Connectivity (DC) in which communication is performed between the UE and each of two NG-RAN nodes at the same time, and the like.

The amplifying unit 220 is implemented by a power amplifier (PA)/low noise amplifier (LNA) or the like. The amplifying unit 220 amplifies a signal output from the modulation/demodulation unit 230 to a predetermined power level. Further, the amplifying unit 220 amplifies an RF signal output from the radio signal transmitting/receiving unit 210.

The modulation/demodulation unit 230 performs data modulation/demodulation, transmission power setting, resource block allocation, and the like for each predetermined communication destination (the gNB 100 or another gNB).

The control signal/reference signal processing unit 240 performs processing related to various control signals transmitted and received by the UE 200 and processing related to various reference signals transmitted and received by the UE 200.

Specifically, the control signal/reference signal processing unit 240 receives various control signals transmitted from the gNB 100 via a predetermined control channel, for example, a control signal of a radio resource control layer (RRC). In addition, the control signal/reference signal processing unit 240 transmits various control signals to the gNB 100 via a predetermined control channel.

The control signal/reference signal processing unit 240 performs processing using a reference signal (RS) such as a demodulation reference signal (DMRS) or a phase tracking reference signal (PTRS).

The DMRS is a known downlink (base station to terminal) terminal-specific reference signal (pilot signal) for estimation of a fading channel used for data demodulation. The PTRS is a terminal-specific reference signal for estimation of phase noise, which is a problem in high frequency bands.

Note that, in addition to the DMRS and the PTRS, the reference signal also includes a channel state information-reference signal (CSI-RS) and a sounding reference signal (SRS).

Further, the channels include a control channel and a data channel. Examples of the control channel include a physical downlink control channel (PDCCH), a physical uplink control channel (PUCCH), a physical random access channel (PRACH), and a physical broadcast channel (PBCH).

Further, in the present embodiment, the control signal/reference signal processing unit 240 can transmit the RA preamble on the PRACH. In the present embodiment, the control signal/reference signal processing unit 240 constitutes a transmitting unit.

As described above, the PRACH is a random access channel and is a kind of channel for access of the UE 200 to the network. Note that the initial access channel is not necessarily limited to the PRACH as long as it is a channel used in the initial access.

The control signal/reference signal processing unit 240 can transmit the RA preamble on the PRACH set based on initial access configurations. Specifically, the control signal/reference signal processing unit 240 sets the PRACH based on Random access configurations specified in clause 6.3.3.2 of 3GPP TS38.211 and the like.

Further, the control signal/reference signal processing unit 240 can transmit, on the PRACH, an RA preamble set based on a format (which may also be referred to as a preamble format) applied to the RA preamble by the control unit 270.

Furthermore, the control signal/reference signal processing unit 240 can transmit an RA preamble with less resources in the time direction (which may also be referred to as a symbol direction or a resource block direction) as compared with a case of using frequency bands including FR1 and FR2. Further, in this case, the control signal/reference signal processing unit 240 can transmit an RA preamble with increased resources in the frequency direction (which may also be referred to as a subcarrier direction or the like) as compared with a case of using the frequency bands including FR1 and FR2.

The coding/decoding unit 250 performs data division/concatenation, channel coding/decoding, and the like for each predetermined communication destination (the gNB 100 or another gNB).

Specifically, the coding/decoding unit 250 divides data output from the data transmitting/receiving unit 260 into pieces of data each having a predetermined size, and performs channel coding on the data obtained by the division. Further, the coding/decoding unit 250 decodes data output from the modulation/demodulation unit 230 and concatenates the decoded data.

The data transmitting/receiving unit 260 performs transmission/reception of a protocol data unit (PDU) and a service data unit (SDU). Specifically, the data transmitting/receiving unit 260 performs assembly/disassembly of the PDU/SDU in a plurality of layers (a medium access control layer (MAC), a radio link control layer (RLC), a packet data convergence protocol layer (PDCP), and the like). Further, the data transmitting/receiving unit 260 performs data error correction and retransmission control based on a hybrid automatic repeat request (hybrid ARQ).

The control unit 270 controls each functional block constituting the UE 200. Particularly, in the present embodiment, the control unit 270 performs a control related to the initial access of the UE 200 to the network.

Specifically, in a case of using a different frequency band that is different from the frequency bands including FR1 and FR2, for example, FR4, the control unit 270 can apply common initial access configurations to all of the plurality of SCSs (see FIG. 3 and Table 1).

More specifically, in the radio communication system 10, as described above, SCSs of 480 kHz, 960 kHz and 1920 kHz can be used in addition to the SCS of up to 240 kHz. Even in a case of using such a different SCS, the control unit 270 can apply common initial access configurations, that is, initial access configurations having the same configuration content. The initial access configurations mean the Random access configurations specified in clause 6.3.3.2 of TS 38.211 or the like, as described above, and details thereof will be described later.

In a case of using a plurality of different frequency bands (for example, FR3 and FR4), the control unit 270 may apply initial access configurations to at least some of the different frequency bands (for example, FR4), the initial access configurations being different from those applied to the frequency bands including FR1 and FR2. Note that the control unit 270 may apply initial access configurations to each of the plurality of different frequency bands, the initial access configurations being different from that applied to the frequency bands including FR1 and FR2 and different from that applied to other different frequency bands.

Further, the plurality different frequency bands here may mean frequency ranges (FR) such as FR3 and FR4, or may mean a plurality of sub-bands set within the frequency range (for example, FR4). In this case, the control unit 270 may apply initial access configurations to at least some (for example, 1920 kHz) of the plurality of SCSs, the initial access configurations being different from that applied to other SCSs (for example, 960 kHz or less). In this case, different SCSs may be associated with different frequency bands (for example, FR3 and FR4), respectively.

Note that the control unit 270 may apply to at least some (for example, 1920 kHz) of the plurality of SCSs, initial access configurations different from those for other SCSs in a case of using the different frequency band (for example, FR4) regardless of the number of different frequency bands, that is, even in a case where the number of different frequency bands is one.

Further, in a case of using the different frequency band, the control unit 270 can apply any one of plurality of formats (preamble formats) of an initial access signal, the applied format being different from that for the frequency bands including FR1 and FR2.

Specifically, the control unit 270 can apply any one of the plurality of formats of the RA preamble (however, the applied format is different from the format when using FR1 and FR2). The preamble format may include a cyclic prefix (CP) and a guard time (GT). In the present embodiment, the number of samples of the CP may be larger than the number of samples of the GT.

Note that a specific example of the preamble format will be described later.

The control unit 270 can apply a format according to the SCS in the different frequency band. Specifically, the control unit 270 can apply the same format to different SCSs (for example, 240 kHz and 480 kHz).

Alternatively, the control unit 270 may apply a format different from that applied to other SCSs (for example, 960 kHz or less) to at least some (for example, 1920 kHz) of a plurality of SCSs. Note that in a case of using a plurality of different frequency bands, different SCSs may be associated with the different frequency bands, respectively.

Further, in a case of using the different frequency band, the control unit 270 can set an initial access channel configured with a smaller number of resource blocks (RB) as compared with a case of using the frequency bands including FR1 and FR2. Specifically, when using the different frequency band such as FR4, the control unit 270 sets a PRACH configured with a smaller number of RBs (or PRBs) as compared with a case of using FR1 and FR2.

In this case, the control unit 270 may set a PRACH with a smaller number of RBs in accordance with an increase of the SCS. For example, in a case where the SCS is 240 kHz, the number of RBs can be set to 6, and in a case where the SCS is 480 kHz, the number of RBs can be set to 3.

Further, in this case, the control unit 270 may set a PRACH with a shorter sequence length, as compared with a case of using the frequency bands including FR1 and FR2. The sequence here may mean a RACH sequence, or may be interpreted as the preamble sequence described above, the logical root sequence, or the Zadoff-Chu sequence.

Further, in a case of using the different frequency band, the control unit 270 can set a duration of the initial access channel to which a gap is added in the time direction. Specifically, the control unit 270 can set a PRACH duration to which a time gap for antenna beam switching is added.

Note that the antenna beam may be simply called a beam, an antenna panel (or simply a panel), an antenna port, or the like. In addition, the time gap may be interpreted as being provided between ROs.

The control unit 270 may obtain information indicating the gap from the network and set the PRACH duration based on the obtained information. The information indicating the gap may be obtained by any one of signaling of a higher layer (for example, RRC) or signaling of a lower layer (for example, downlink control information (DCI)).

The control unit 270 may set the PRACH duration by adding a gap to the guard time (GT) included in the RA preamble. Specifically, the control unit 270 can increase the number (length) of samples of the GT in consideration of the time gap for antenna beam switching.

In a case of using the different frequency band, the control unit 270 can apply initial access configurations including the RA preamble format that are different from those for the frequency bands including FR1 and FR2. Specifically, the control unit 270 can apply random access configurations including an RA preamble format (preamble format) for the different frequency band such as FR4, in the Random access configurations specified in clause 6.3.3.2 of 3GPP TS38.211, the RA preamble format being different from that for FR1 and FR2.

In this case, the control unit 270 may apply initial access configurations (or table) in which a maximum slot number associated with the format is increased as the SCS is increased. The maximum slot number may mean a slot number specified clause 6.3.3.2 of 3GPP TS38.211 or the like.

Further, in this case, the control unit 270 may apply initial access configurations in which a PRACH duration including a beam switching time is specified. Note that the beam switching time may be interpreted as the above-mentioned time gap for antenna beam switching.

Alternatively, the control unit 270 may apply initial access configurations in which the beam switching time is provided. That is, initial access configurations in which the PRACH duration does not include the beam switching time (gap), and the beam switching time (gap) is provided independently may be applied.

Further, in this case, when the initial access configurations are associated with a plurality of SCSs, the control unit 270 may assume a minimum SCS for the different frequency band. For example, in a case where the SCS for FR4 (or in a case where FR4 is divided into a plurality of sub-bands as described later) can be set to 240 kHz and 480 kHz, the control unit 270 may assume a minimum SCS of 240 kHz and control each functional block of the UE 200 based on the SCS.

(3) OPERATION OF RADIO COMMUNICATION SYSTEM

Next, an operation of the radio communication system 10 will be described. Specifically, an operation related to initial access of the terminal (UE 200) to the network will be described.

More specifically, an operation related to a random access (RA) procedure in the different frequency band that is different from the frequency bands including FR1 and FR2, such as FR4, will be described.

(3.1) PROBLEM RELATED TO RANDOM ACCESS CHANNEL

First, a problem related to a random access channel, specifically, the PRACH, in a case of using a high frequency band such as FR4 will be described.

In 3GPP Release 15 (hereinafter, Release 15), for the PRACH, SCSs of 1.25 kHz, 5 kHz, 15 kHz, 30 kHz, 60 kHz, and 120 kHz are supported. As described above, in the high frequency band such as FR4, an increase of the SCS is considered, and an OFDM symbol length (symbol duration) is decreased (a CP length and a GT length are also decreased). Therefore, when considering a propagation delay of an RA preamble transmitted in a PRACH occasion (RO) within a cell, the propagation delay exceeds the CP length and GT length due to a shorter distance, and thus a reachable range of the RA preamble, that is, a coverage is also decreased, which is problematic.

Figure 5:
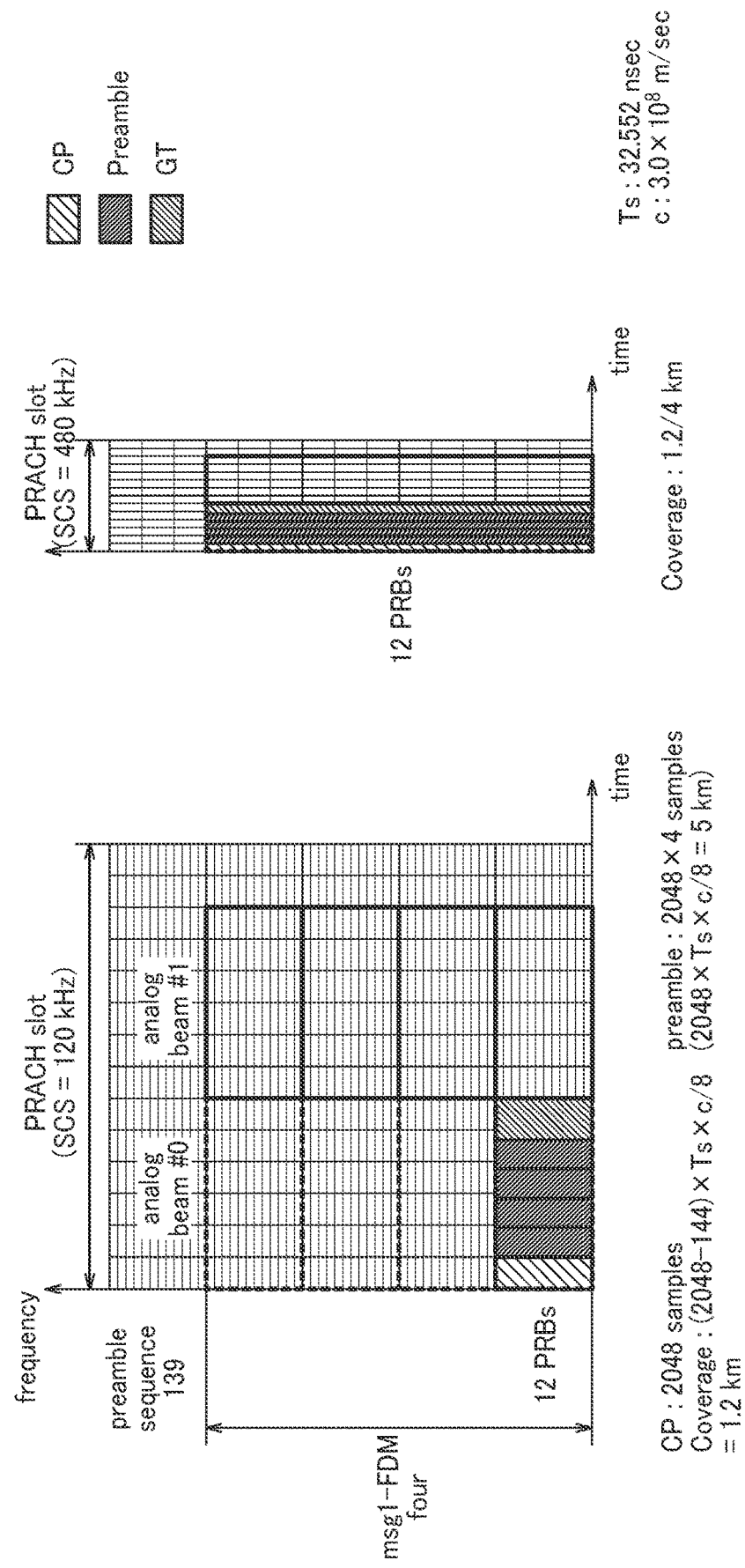
FIG. 5 is a diagram illustrating an example in which a length of an RA preamble is decreased as an SCS is increased.

FIG. 5 illustrates an example in which a length of the RA preamble is decreased as the SCS is increased. The left side of FIG. 5 illustrates a configuration example of the RA preamble in a case where SCS=120 kHz. The right side of FIG. 5 illustrates a configuration example of the RA preamble in a case where SCS=480 kHz.

As illustrated in FIG. 5, the coverage of the RA preamble (PRACH) in a case where SCS=120 kHz is about 1.2 km, but the coverage of the RA preamble in a case where SCS=480 kHz is about 1.2/4 km (=0.3 km).

Further, as the length of the RA preamble is decreased, a cyclic shift amount (>2 times the cell radius) is also limited, and the number of patterns of the preamble is decreased. As described above, in Release 15, 64 RA preambles are used for each RO. Note that although an increase of the root sequence can compensate for to some extent, the number of RA preambles is limited (depending on the RACH sequence).

Furthermore, when the SCS is increased, power density of the PRACH, specifically, power spectral density (PSD), is reduced. In addition, when the OFDM symbol length is decreased, it is necessary to have consideration so that the beam switching time for transmission on the PRACH can be secured.

(3.2) OVERVIEW OF OPERATION

In the present operation example, the following increases axe applied mainly to a case of using a high frequency band such as FR4 in order to solve the above-described problem.

Increase the SCS for the PRACH to 240 kHz, 480 kHz, 960 kHz, and 1920 kHz

Add a new preamble format (6, 12, and 24 symbols)

Reduce a PRACH frequency bandwidth (the number of RBs) (1/n) (to maintain power density of the PRACH)

In this case, the RACH sequence (139 or 839) needs to be 1/n as the number of RBs is decreased. In addition, the number of RA preambles per RO needs to be decreased (1/n) in accordance with a reduction of a cyclic shift pattern and the RACH sequence. Note that the decrease of the number of RA preambles per RO may be compensated for by time division multiplexing (FDM). Specifically, an upper limit on the number of times of performing the FDM is relaxed.

Add a symbol for the beam switching time between PRACHs (or between ROs)

Figure 6:
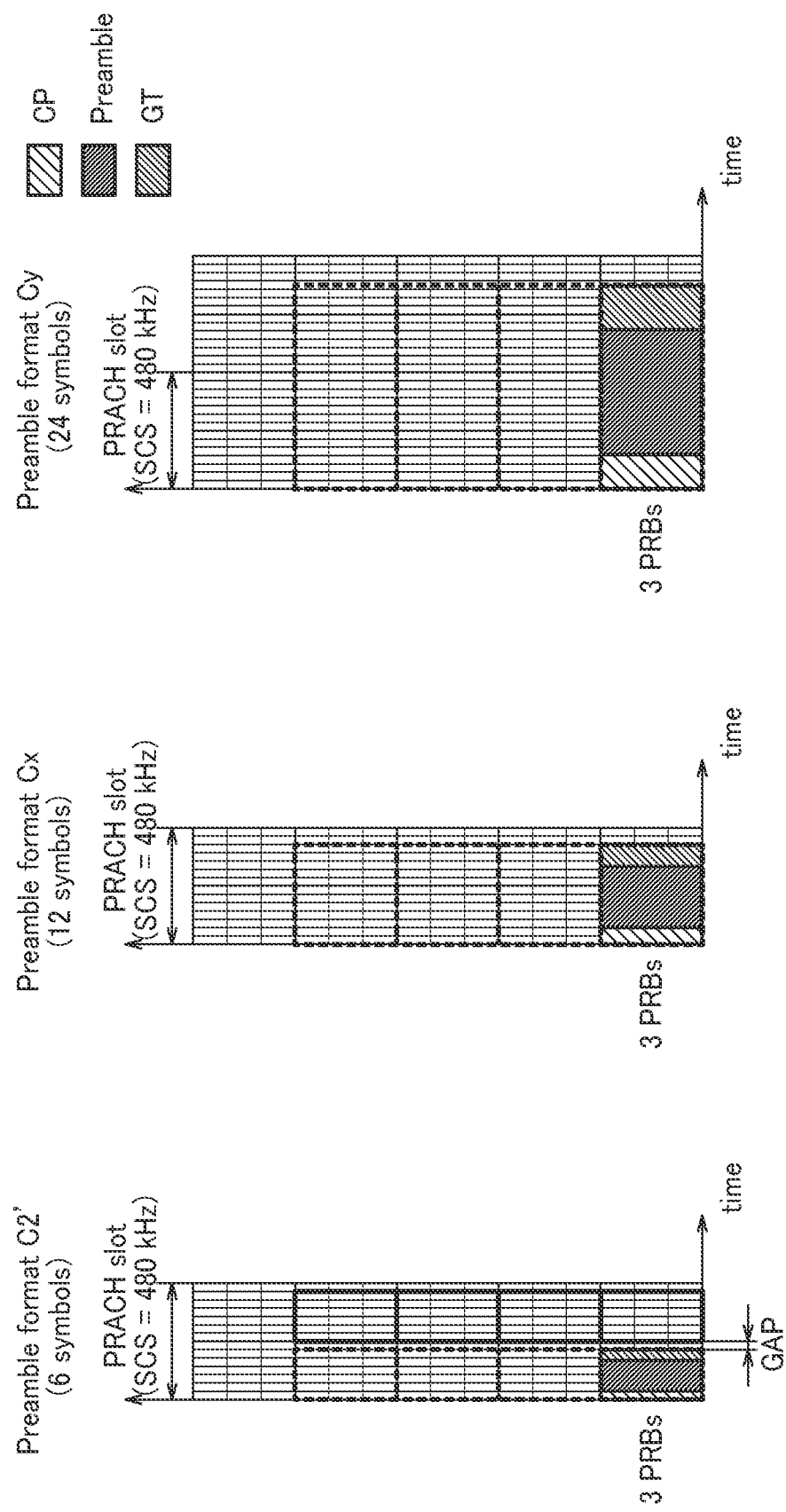
FIG. 6 is a diagram illustrating configuration examples of a preamble format according to the present embodiment.

FIG. 6 illustrates configuration examples of the preamble format according to the present embodiment. Specifically, FIG. 6 illustrates three configuration examples. All the three configuration examples are applied to a case where SCS=480 kHz.

In a format C2', the RA preamble is configured with 6 symbols. In a format Cx, the RA preamble is configured with 12 symbols. In a format Cy, the PA preamble is configured with 24 symbols. All of the formats C2', Cx and Cy are new formats.

The increase described above may be further expressed as follows.

(i) Increase of SCS to 240/480/960/1920 kHz
  (Plan 1): Apply one configuration table (Random access configurations) corresponding to all SCSs
  (Plan 2): Specify a plurality of new frequency bands (different frequency bands) and apply a configuration table corresponding to an SCS different for each frequency band
  (Plan 3): Apply an individual configuration table for each SCS
(ii) Addition of New Preamble Format
(iii) Reduction of PRACH Frequency Bandwidth (Number of RBs)
(iv) Insertion of Gap for Antenna Beam Switching Between ROs
  (Plan 1): Reflect a gap between ROs in a predetermined calculation formula (clause 5.3.2 of 3GPP TS38.211)
  (Plan 2): Add a gap to the configuration table (Random access configurations)
  (Plan 3): Reflect a gap in the preamble format
(v) Enhancement of Configuration Table (Random access configurations) According to (i) to (iv)

(3.3) OPERATION EXAMPLES

Hereinafter, operation examples of the terminal (UE 200) related to (i) to (v) above will be described.

(3.3.1) Operation Example 1

The present operation example corresponds to (i) above. That is, the SCS applied to the PRACH is increased to 240 kHz, 480 kHz, 960 kHz, and 1920 kHz.

Figure 7:
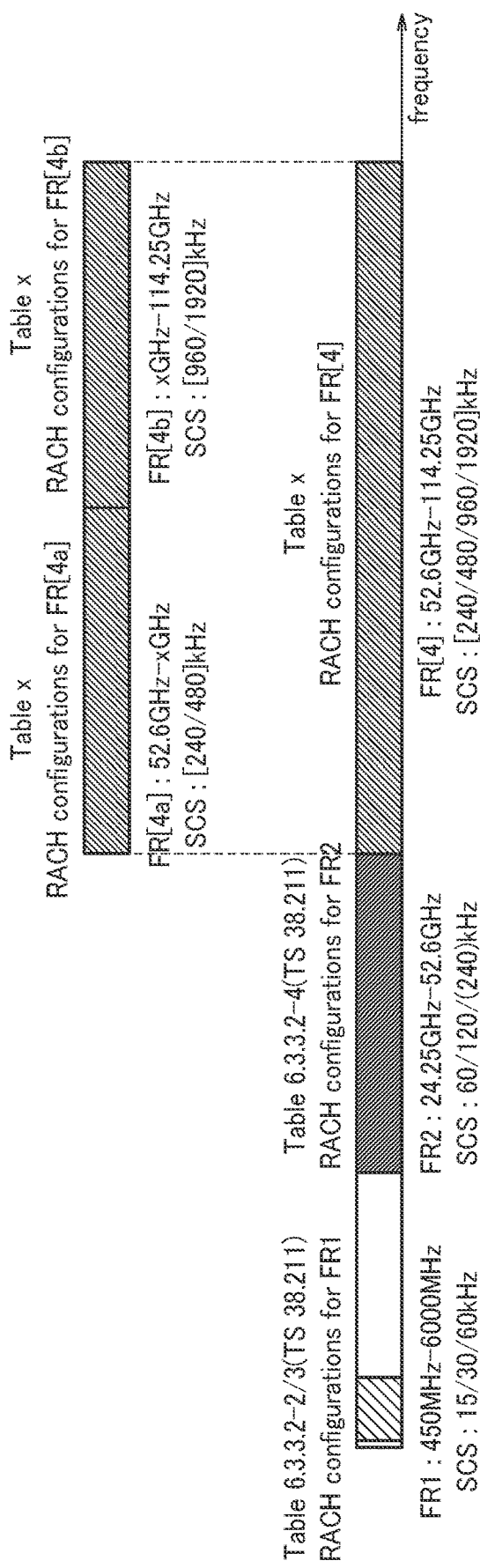
FIG. 7 is a diagram illustrating an example of a correspondence between a frequency range corresponding to a different frequency band and a configuration table (Random access configurations).

FIG. 7 illustrates an example of a correspondence between a frequency range corresponding to a different frequency band and a configuration table (Random access configurations).

As illustrated in FIG. 7, any of the following may be applied as a configuration of the configuration table (Random access configurations, RACH configurations for FRxx in FIG. 7).
  (Configuration 1): In a frequency band of 52.6 GHz or higher, one new frequency band (FR[4]) is specified, and one configuration table corresponding to all SCSs (for example, 240 kHz, 480 kHz, 960 kHz, and 1920 kHz) is applied.
  (Configuration 2): In a frequency band of 52.6 GHz or higher, a plurality of new frequency bands (FR[4a] and FR[4b]) are specified, and a configuration table corresponding to SCSs (for example, SCS={240 kHz and 480 kHz} for FR[4a], and SCS={960 kHz and 1920 kHz} for FR[4b]) different for each frequency band is applied.
  (Configuration 3): An individual configuration table is applied to each SCS regardless of the number of new frequency bands.

Note that the configuration table may be interpreted as a specific example showing a content of the above-described initial access configurations. Further, in a case where the configuration table corresponds to a plurality of SCSs, the terminal may use a corresponding minimum SCS (for example, FR1: 15 kHz and FR2: 60 kHz) as a reference, that is, the terminal may assume a minimum SCS.

Figure 8:
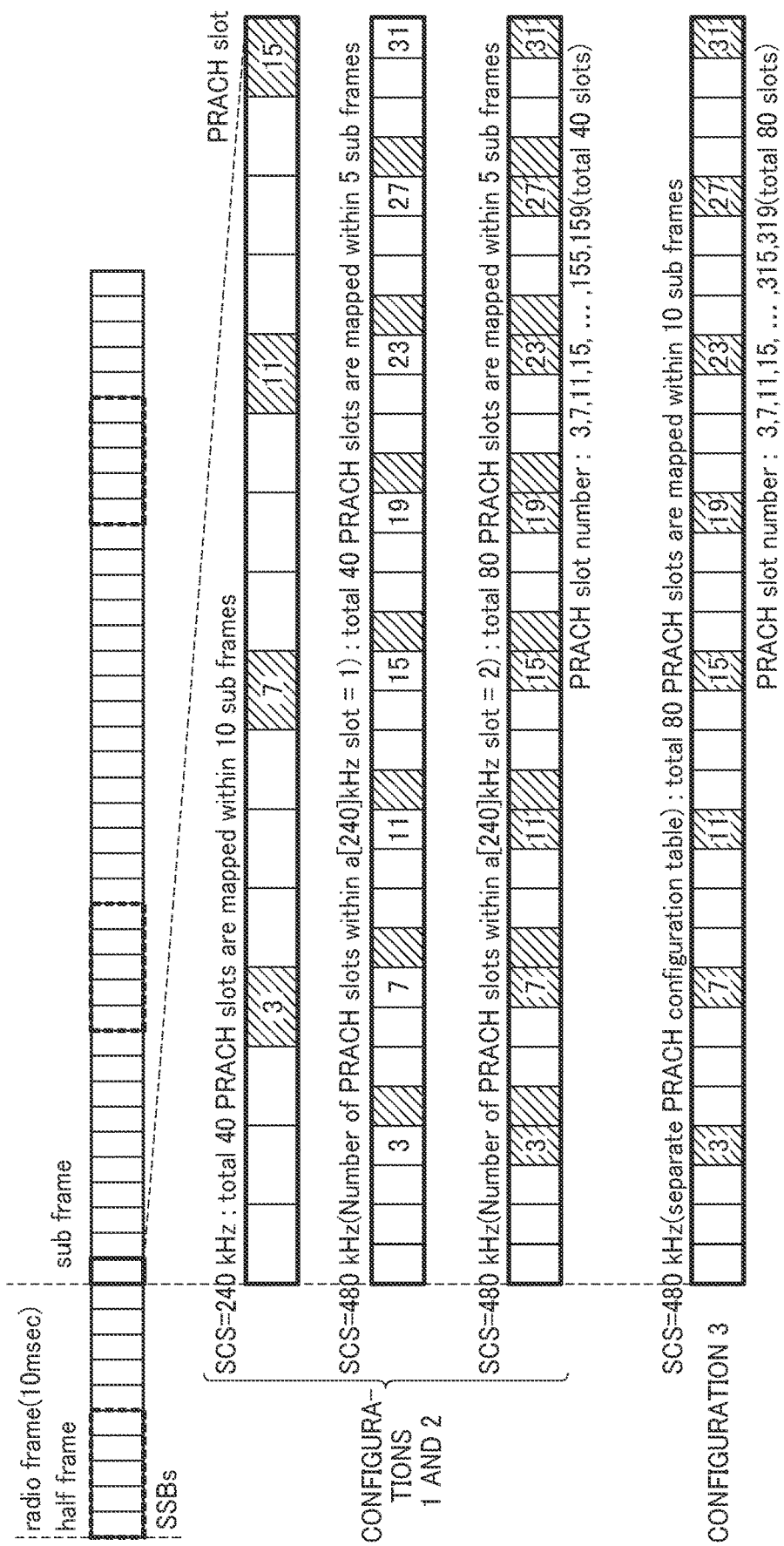
FIG. 8 is a diagram illustrating examples of mapping of PRACH slots in a time direction.

FIG. 8 illustrates examples of mapping of PRACH slots in the time direction. Specifically, FIG. 8 illustrates examples of mapping of PRACH slots according to (Configuration 1) to (Configuration 3) described above. Note that mapping examples (SCS=480 kHz) for (Configurations 1 and 2) illustrated in FIG. 8 are based on a configuration of PRACH slots in a case where SCS=240 kHz.

As illustrated in FIG. 8, the terminal can assume mapping of PRACH slots that is different for each SCS. Further, the terminal may assume mapping of the number of PRACH slots (40 or 80) included in a radio frame or subframe according to the number of PRACH slots in a subframe (1 or 2) even in a case of the same SCS.

(3.3.2) Operation Example 2

The present operation example corresponds to (ii) above. That is, a new preamble format is added. Specifically, an RA preamble configured with 6, 12, or 24 symbols is added.

Figure 9:
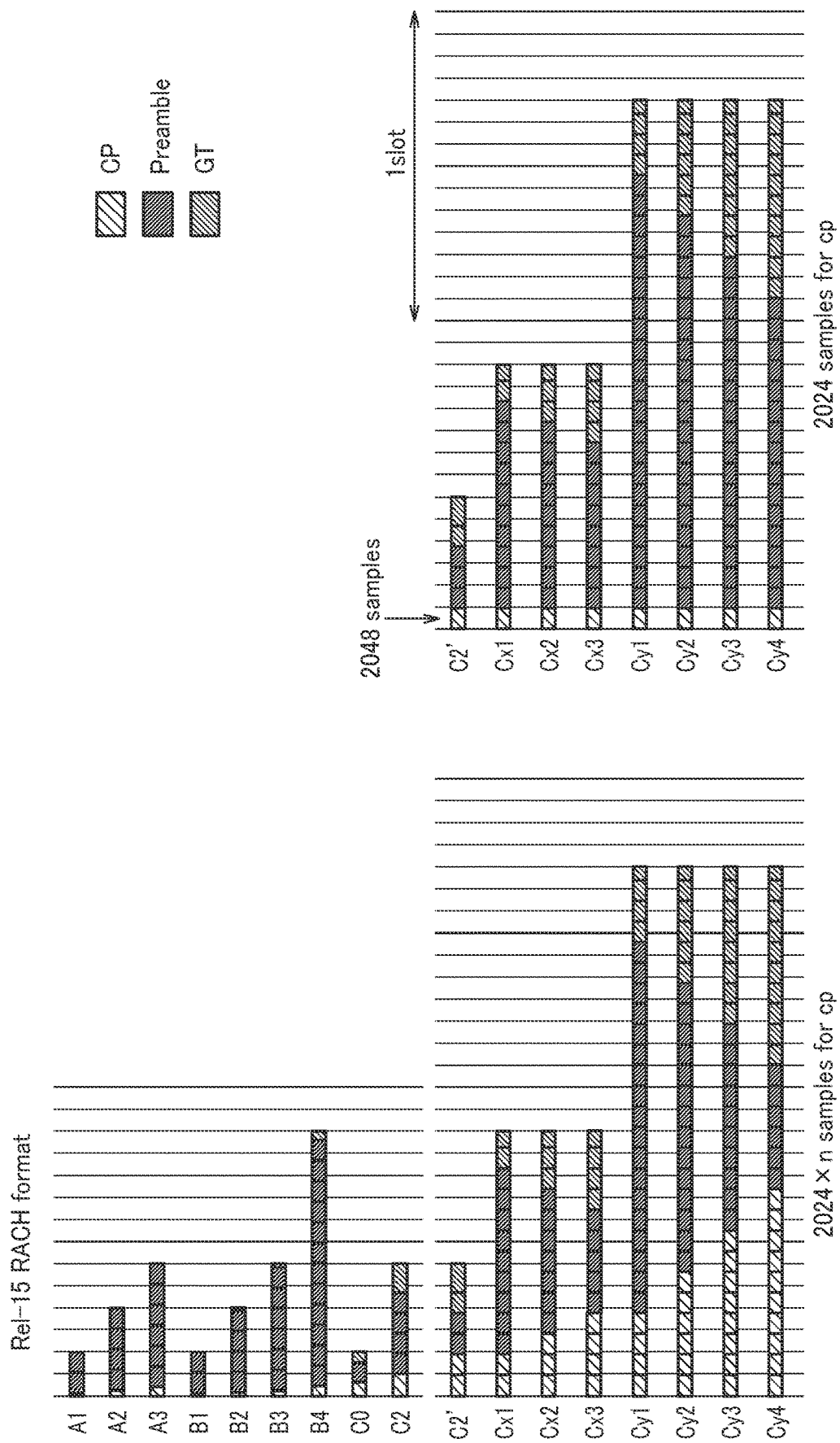
FIG. 9 is a diagram illustrating an example of a preamble format according to Operation Example 2.

In this case, the number of samples configuring the PRACH is as follows (similar to Release 15).
  6 symbols: 2048×6+864 samples
  12 symbols: 2048×12+1728 samples
  24 symbols: 2048×25+1408 samples FIG. 9 illustrates an example of a preamble format according to Operation Example 2. The terminal can assume a preamble format as illustrated in FIG. 9.

Specifically, as illustrated in FIG. 9, the cyclic prefix (CP) is configured with 2048×n samples, and the preamble is configured with m samples. The guard time (GT) is configured with 2048×l+excess samples (less than 2048).

Here, the CP is preferably set longer than the GT. For example, in a case where the CP is configured with 2048×n samples, the GT is configured with 2048×(n−1)+excess samples. Note that the CP may be configured with 2048 samples or less. In this case, a leading preamble may be used as the CP.

Further, a preamble format to be applied may be determined based on a coverage of the RA preamble.

Figure 10:
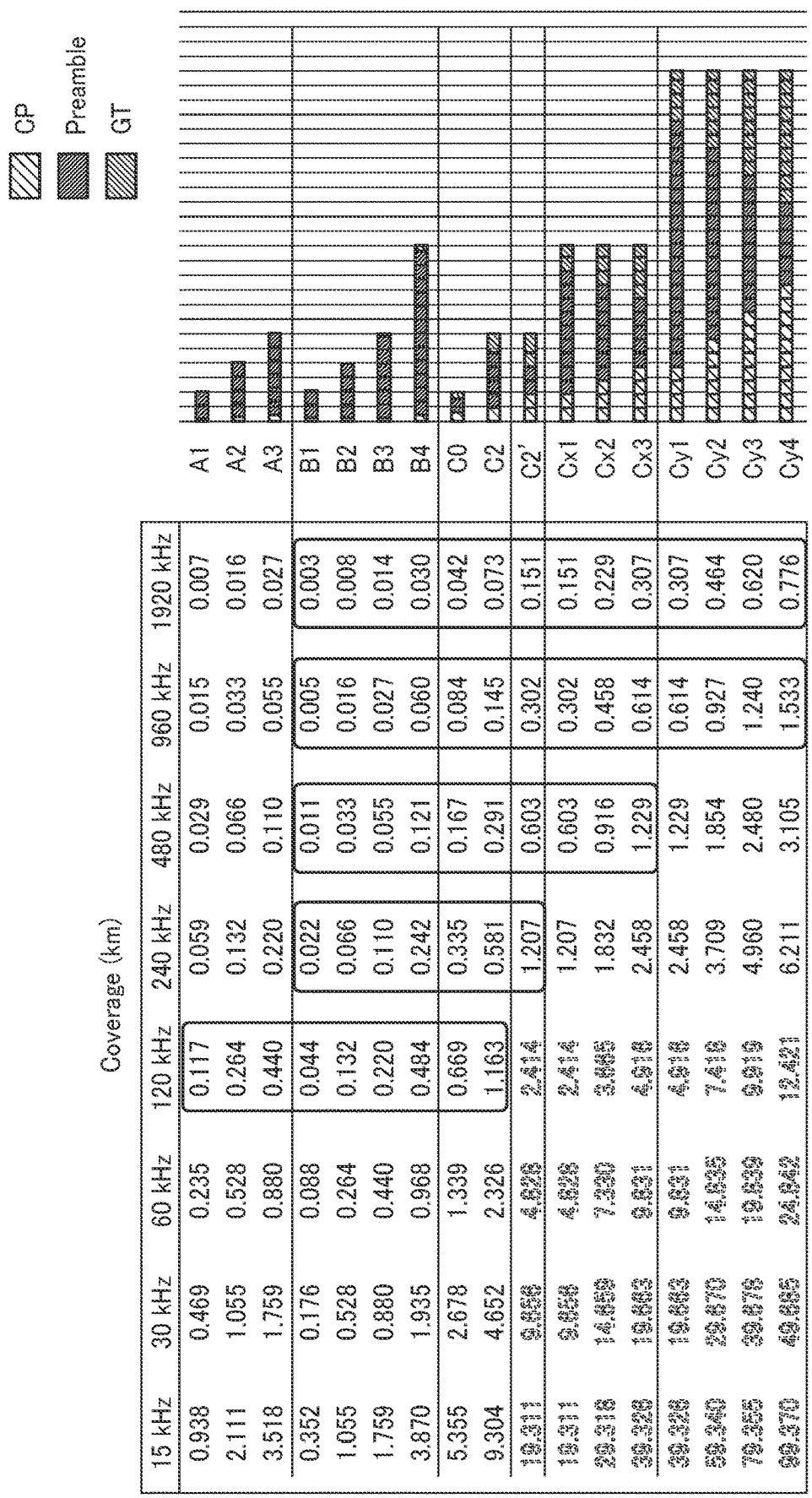
FIG. 10 is a diagram illustrating a correspondence (Part 1) between a coverage of an RA preamble and a preamble format configuration.

FIG. 10 illustrates a correspondence (Part 1) between a coverage of an RA preamble and a preamble format configuration. For example, a preamble format to be applied may be determined as follows. In FIG. 10, a value of a coverage corresponding to a preamble format (hereinafter, referred to as a format) used for a corresponding SCS is surrounded by a frame line.
  (Example 1): In a case where SCS=240 kHz or more, a format A is not used.
  In this case, determination may be made as follows.
  (Example 1-1): Apply one configuration table (Random access configurations) corresponding to all SCSs (240/480/960/1920 kHz) (for example, formats B/C/Cx/Cy).
  (Example 1-2): Specify a plurality of new frequency bands and apply a configuration table corresponding to an SCS different for each frequency band (for example, SCS={240, 480 kHz}: formats B/C/Cx, and SCS={960, 1920 kHz}: formats B/C/Cx/Cy).
  (Example 1-3): Apply an individual configuration table for each SCS (for example, SCS=240 kHz: formats B/C, SCS=480 kHz: formats B/C/Cx, SCS=960 kHz: formats B/C/Cx/Cy, and SCS=1920 kHz: formats B/C/Cx/Cy).

Figure 11:
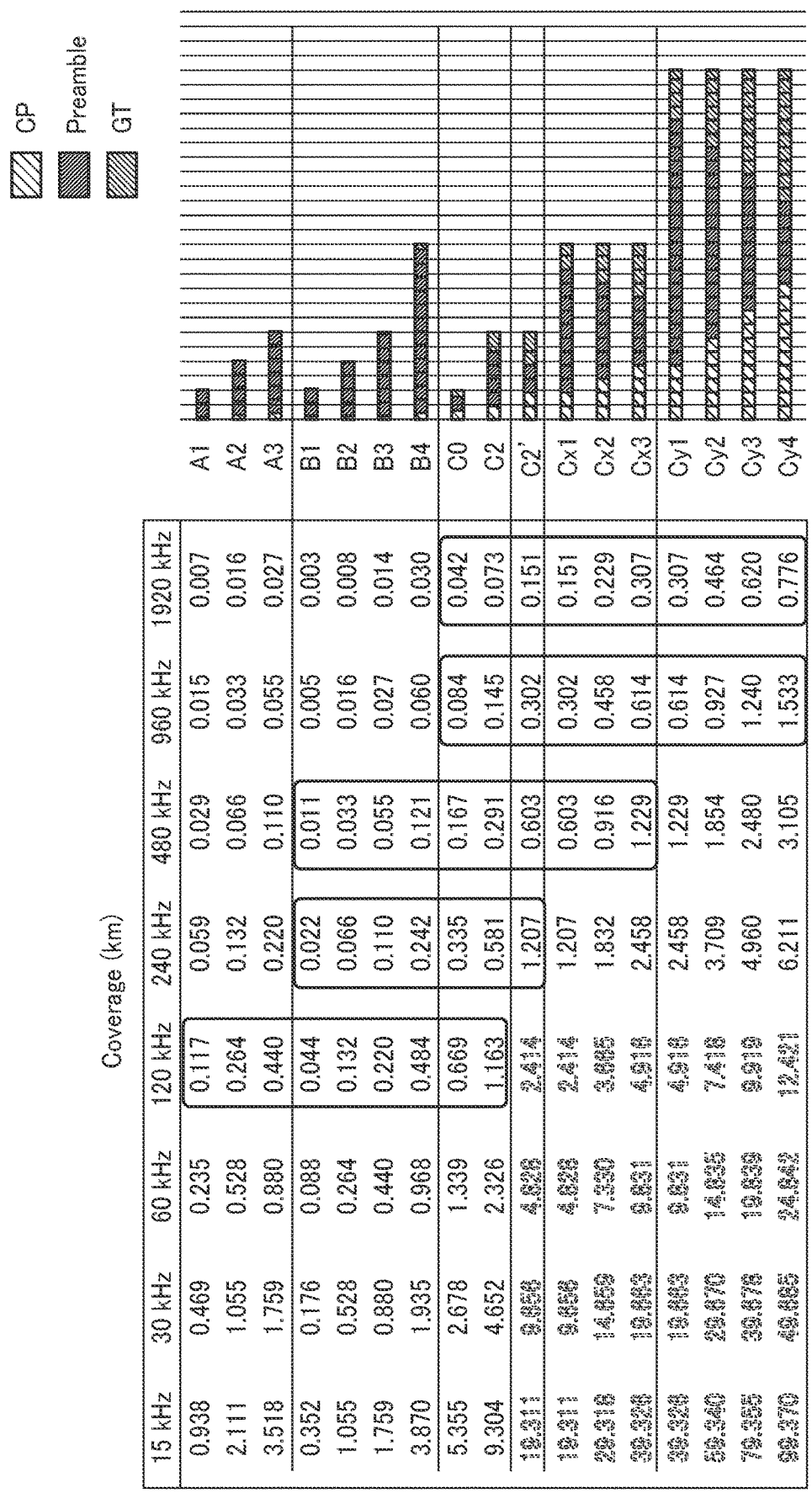
FIG. 11 is a diagram illustrating a correspondence (Part 2) between a coverage of an RA preamble and a preamble format configuration.

FIG. 11 illustrates a correspondence (Part 2) between a coverage of an RA preamble and a preamble format configuration. Also in FIG. 11, a value of a coverage corresponding to a preamble format (hereinafter, referred to as a format) used for a corresponding SCS is surrounded by a frame line.

(Example 2): In a case where SCS=240 kHz or more, a format A is not used. Further, in a case where SCS=960 kHz or more, a format B is not used.

In this case, determination may be made as follows.

(Example 2-1): Apply one configuration table (Random access configurations) corresponding to all SCSs (240/480/960/1920 kHz) (for example, formats B/C/Cx/Cy).

(Example 2-2) Specify a plurality of new frequency bands and apply a configuration table corresponding to an SCS different for each frequency band (for example, SCS={240, 480 kHz}: formats B/C/Cx, and SCS={960, 1920 kHz}: formats C/Cx/Cy).

(Example 2-3): Apply an individual configuration table for each SCS (for example, SCS=240 kHz: formats B/C, SCS=480 kHz: formats B/C/Cx, SCS=960 kHz: formats C/Cx/Cy, and SCS=1920 kHz: formats C/Cx/Cy).

(3.3.3) Operation Example 3

The present operation example corresponds to (iii) above. That is, since power density of the PRACH is maintained, the PRACH frequency bandwidth (the number of RBs) is reduced.

For example, in a case where SCS=240 kHz, the number of RBs is 6, and in a case where SCS=480 kHz, the number of RBs is 3 (see FIG. 6). Note that the number of RBs is specified as 12 in Release 15.

Further, the RACH sequence (139, 839) is also reduced as the number of RBs is decreased. For example, in a case of 6 RBs, a prime number (71) near 139/2 can be used, and in a case of 3 RBs, a prime number (31 or 37) near 139/4 can be used.

Table 2 shows an example of combinations of parameters related to random access, including a RACH sequence, an SCS for a PRACH, an SCS for a PUSCH, and the like according to Operation Example 3. Specifically, Table 2 corresponds to Table 6.3.3.2-1 of 3GPP TS38.211.

TABLE 2

| $L_{RA}$ | $\Delta f^{RA}$ for PRACH | $\Delta f$ for PUSCH | $N_{RB}^{RA}$, allocation expressed in number of RBs for PUSCH | $\bar{k}$ |
|---|---|---|---|---|
| 839 | 1.25 | 15 | 6 | 7 |
| 839 | 1.25 | 30 | 3 | 1 |
| 839 | 1.25 | 60 | 2 | 133 |
| 839 | 5 | 15 | 24 | 12 |
| 839 | 5 | 30 | 12 | 10 |
| 839 | 5 | 60 | 6 | 7 |
| 139 | 15 | 15 | 12 | 2 |
| 139 | 15 | 30 | 6 | 2 |
| 139 | 15 | 60 | 3 | 2 |
| 139 | 30 | 15 | 24 | 2 |
| 139 | 30 | 30 | 12 | 2 |
| 139 | 30 | 60 | 6 | 2 |
| 139 | 60 | 60 | 12 | 2 |

TABLE 2-continued

| $L_{RA}$ | $\Delta f^{RA}$ for PRACH | $\Delta f$ for PUSCH | $N_{RB}^{RA}$, allocation expressed in number of RBs for PUSCH | $\bar{k}$ |
|---|---|---|---|---|
| 139 | 60 | 120 | 6 | 2 |
| 139 | 120 | 60 | 24 | 2 |
| 139 | 120 | 120 | 12 | 2 |
| <u>71</u> | <u>240</u> | <u>240</u> | <u>6</u> | |
| <u>37</u> | <u>480</u> | <u>480</u> | <u>3</u> | |

As shown in Table 2, 71 and 37 are added in addition to $L_{RA}$=839 and 139 (see underlined parts). In addition, the number of preambles per RO is decreased from 64 in accordance with a reduction of the cyclic shift pattern and the RACH sequence. Note that the reduction in the preamble may be compensated for by the FDM, that is, by an increase in the frequency direction, as described above.

For example, an upper limit of the number of times of performing the FDM may be 16 or 32, which is larger than 8 specified in Release 15.

(3.3.4) Operation Example 4

The present operation example corresponds to (iv) above. That is, a gap for antenna beam switching is inserted between ROs.

A method of inserting the gap for antenna beam switching may be any of the following. Specifically, the gap provided between ROs may be included in a symbol position calculation formula. (Equation 1) is a symbol position (symbol position 1) calculation formula specified in clause 5.3.2 of 3GPP TS38.211.

[Math 1]

$$l = l_0 + n_t^{RA} N_{dur}^{RA} + 14 n_{slot}^{RA} \quad \text{(Equation 1)}$$

$l_0$ is given by a parameter (starting symbol) in Tables 6.3.3.2-2 to 6.3.3.2-4 of TS 38.211. $n\_t\hat{}RA$ is a PRACH transmission occasion within a PRACH slot. $N\_dur\hat{}RA$ is a length (corresponding to the number of symbols) of the PRACH and is given by Tables 6.3.3.2-2 to 6.3.3.2-4 of TS 38.211. $n\_slot\hat{}RA$ is the number (1 or 2) of consecutive slots per PRACH slot and is given by a value of the SCS and Tables 6.3.3.2-2 to 6.3.3.2-4 of TS 38.211.

(Equation 2) is a symbol position calculation formula in which the gap (GAP) for antenna beam switching is added to (Equation 1).

[Math 2]

$$l = l_0 + n_t^{RA}(N_{dur}^{RA} + \text{GAP}) + 14 n_{slot}^{RA} \quad \text{(Equation 2)}$$

In (Equation 2), GAP, which is a gap time for antenna beam switching, is added to $N\_dur\hat{}RA$.

Note that a value of GAP may be a fixed value (for example symbol), or the network may notify of the value of GAP according to a form of being included in a configuration table.

Alternatively, GAP may be directly added to the configuration table (Random access configurations) instead of such a symbol position calculation formula.

Table 3 shows a configuration example of the configuration table (Random access configurations) to which GAP, which is a gap time for antenna beam switching, is added. Table 3 corresponds to Table 6.3.3.2-4 of 3GPP TS38.211.

TABLE 6.3.3.2-4

Random access configurations for FR4 and unpaired spectrum.

| PRACH Config. Index | Preamble format | $n_{SFN}$ mod x = y | | Slot number | Starting symbol | Number of PRACH slots within a 60 kHz slot | $N_t^{RA \cdot slot}$, number of time-domain PRACH occasions within a PRACH slot | $N_{dur}^{RA}$, PRACH duration | GAP |
|---|---|---|---|---|---|---|---|---|---|
| | | x | y | | | | | | |
| 173 | C2 | 16 | 1 | 4, 9, 14, 19, 24, 29, 34, 39 | 0 | 2 | 1 | 6 | 1 |
| 174 | C2 | 16 | 1 | 3, 7, 11, 15, 19, 23, 27, 31, 35, 39 | 0 | 2 | 1 | 6 | 1 |

As shown in Table 3, GAP of 1 symbol is included in Random access configurations. Note that, in Table 3, GAP is shown in a form independent of other parameters, but the GAP may be included in the number of symbols of a PRACH duration. That is, in a case where GAP is 1 symbol, the PRACH duration is 7 symbols.

As another method, the gap for antenna beam switching may be included in the preamble format.

Figure 12:
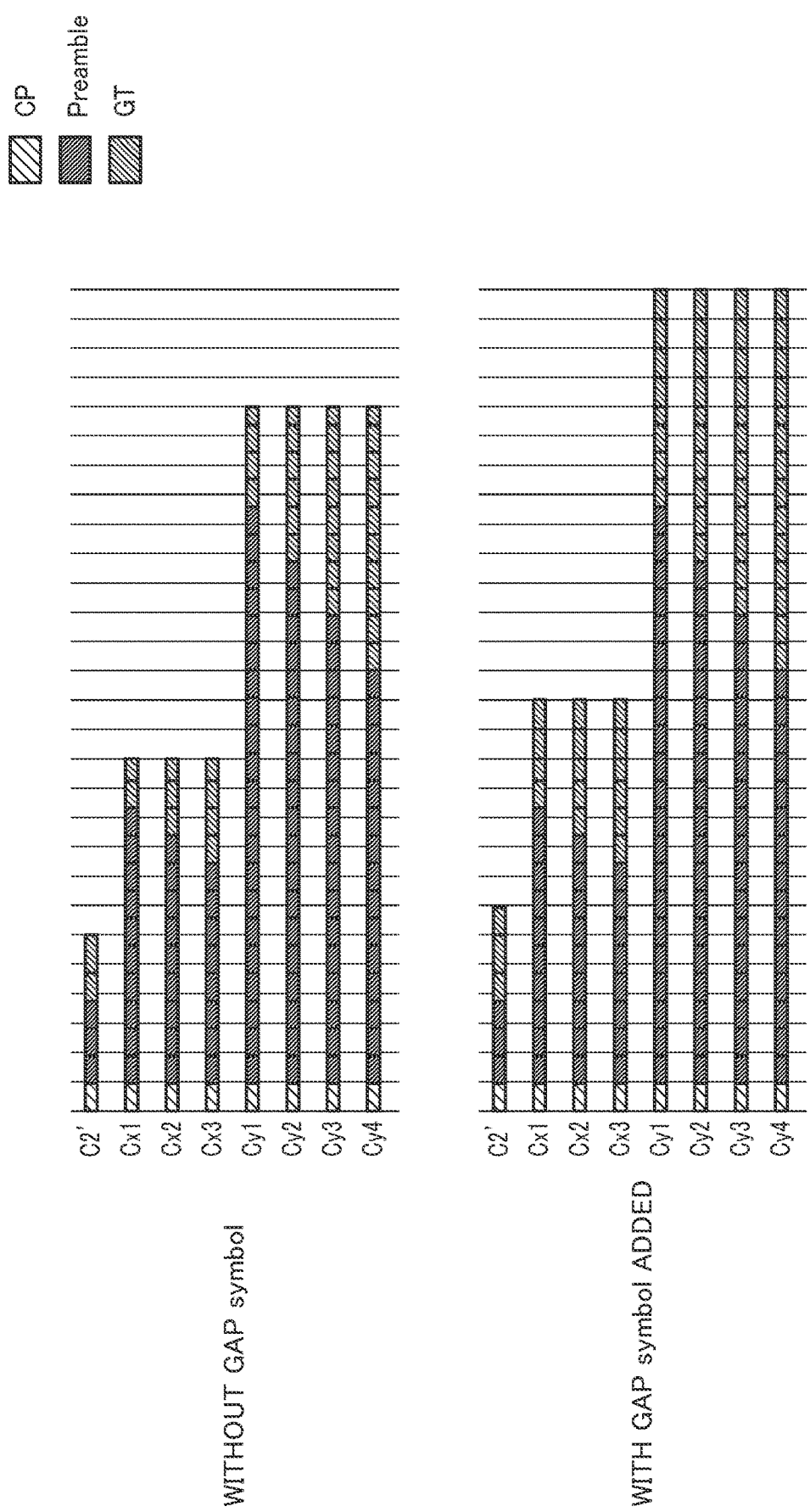
FIG. 12 is a diagram illustrating a preamble format that does not include a gap (GAP) for antenna beam switching and a preamble format that includes the gap.

FIG. 12 illustrates a preamble format that does not include the gap (GAP) for antenna beam switching and a preamble format that includes the gap.

As illustrated in FIG. 12, comparing a format without a GAP symbol (the upper side of FIG. 12) with a format with a GAP symbol added (the lower side of FIG. 12), the number of samples of the GT is increased in the format with a GAP symbol added. That is, the GAP symbol is added to a GT part of the preamble format.

Note that the GAP symbol may be indicated as the GT or may be indicated as a GAP symbol separately from the GT.

(3.3.5) Operation Example 5

The present operation example corresponds to (v) above. That is, the configuration table (Random access configurations) is enhanced according to (i) to (iv) (Operation Examples 1 to 4) above.

Table 4 shows an example of enhancement of the configuration table (Random access configurations).

is increased to a maximum slot number according to a minimum SCS to which the configuration table corresponds.

Specifically, the slot number may be increased to 159 in a case where SCS=240 kHz, may be increased to 319 in a case where SCS=480 kHz, may be increased to 659 in a case where SCS=960 kHz, and may be increased to 1279 in a case where SCS=1920 kHz.

As the number of PRACCH slots, 3 and 4 are added as shown in Table 4 in a case where one configuration table corresponds to three or more different SCSs (3 and 4).

The PRACH duration including a value of GAP, which is the gap time for antenna beam switching, is determined as described above. Note that, as described above, a GAP column is not essential, and the GAP may be included in the PRACH duration.

Further, as described above, in a case where the configuration table corresponds to a plurality of SCSs, a corresponding minimum SCS may be used as a reference (see Operation Example 1).

(4) ACTIONS/EFFECTS

According to the above-described embodiment, the following actions and effects can be obtained. Specifically, in the radio communication system 10, in a case of using the different frequency band such as FR4, the SCS is increased to 240 kHz, 480 kHz, 960 kHz, and 1920 kHz, and an

TABLE 6.3.3.2-4

Random access configurations for FR4 and unpaired spectrum.

| PRACH Config. Index | Preamble format | $n_{SFN}$ mod x = y | | Slot number | Starting symbol | Number of PRACH slots within a 240 kHz slot | $N_t^{RA \cdot slot}$, number of time-domain PRACH occasions within a PRACH slot | $N_{dur}^{RA}$, PRACH duration | GAP |
|---|---|---|---|---|---|---|---|---|---|
| | | x | y | | | | | | |
| 0 | Cx | 16 | 1 | 4, 9, 14, 19, 24, 29, . . . , 159 | 0 | 4 | 2 | 7 | |
| 1 | Cy | 16 | 1 | 3, 7, 11, 15, 19, 23, . . . , 159 | 0 | 4 | 2 | 7 | |

Note that, as described above, a new preamble format may be added. As shown in Table 4, a slot number, which is a maximum slot number associated with a preamble format, appropriate configuration table (Random access configurations) corresponding to a plurality of SCSs, that is, appropriate initial access configurations can be applied.

In the radio communication system 10, a new preamble format can be added in a case of using the different frequency band. Therefore, even in a case where the coverage of the RA preamble can be reduced due to the increase of the SCS, the terminal can transmit an appropriate RA preamble.

In the radio communication system 10, in a case of using the different frequency band, the PRACH frequency bandwidth (the number of RBs) can be reduced. Therefore, even in a case where the SCS is increased, the power density of the PRACH can be maintained.

In the radio communication system 10, a gap for antenna beam switching can be inserted between ROs. Therefore, even in a case where the length of the PA preamble is decreased in accordance with the increase of the SCS, the terminal can reliably perform antenna beam switching.

In the radio communication system 10, the configuration table (Random access configurations) can be enhanced for different frequency bands. Therefore, even in a case of using the increased SCS in the different frequency band, the terminal can reliably and quickly recognize appropriate initial access configurations.

That is, according to the radio communication system 10, the terminal can reliably perform initial access such as an appropriate random access (RA) procedure even in a case of using different frequency bands that are different from FR1/FR2.

(5) OTHER EMBODIMENTS

Although the contents of the present invention have been described above with reference to the embodiment, the present invention is not limited to these descriptions, and it is obvious to those skilled in the art that various modifications and improvements can be made.

For example, in the above-described embodiment, a high frequency band such as FR4, that is, a frequency band beyond 52.6 GHz has been described as an example, but at least one of the operation examples described above may be applied to other frequency ranges such as FR3.

Further, as described above, FR4 may be divided into a plurality of sub-bands like FR4a and FR4b. For example, FR4 may be divided into FR4a and FR4n based on 70 GHz.

Moreover, the block diagram (FIG. 4) used for describing the embodiments illustrates blocks of functional unit. Those functional blocks (structural components) are realized by a desired combination of at least one of hardware and software. A method for realizing each functional block is not particularly limited. That is, each functional block may be realized by one device combined physically or logically. Alternatively, two or more devices separated physically or logically may be directly or indirectly (for example, wiredly or wirelessly) connected to each other, and each functional block may be realized by these plural devices. The functional blocks may be realized by combining software with the one device or the plural devices mentioned above.

Functions include determining, judging, calculating, computing, processing, deriving, investigating, searching, ascertaining, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, functional block (structural component) that causes transmitting is called a transmitting unit or a transmitter. For any of the above, as described above, the realization method is not particularly limited to any one method.

Figure 13:
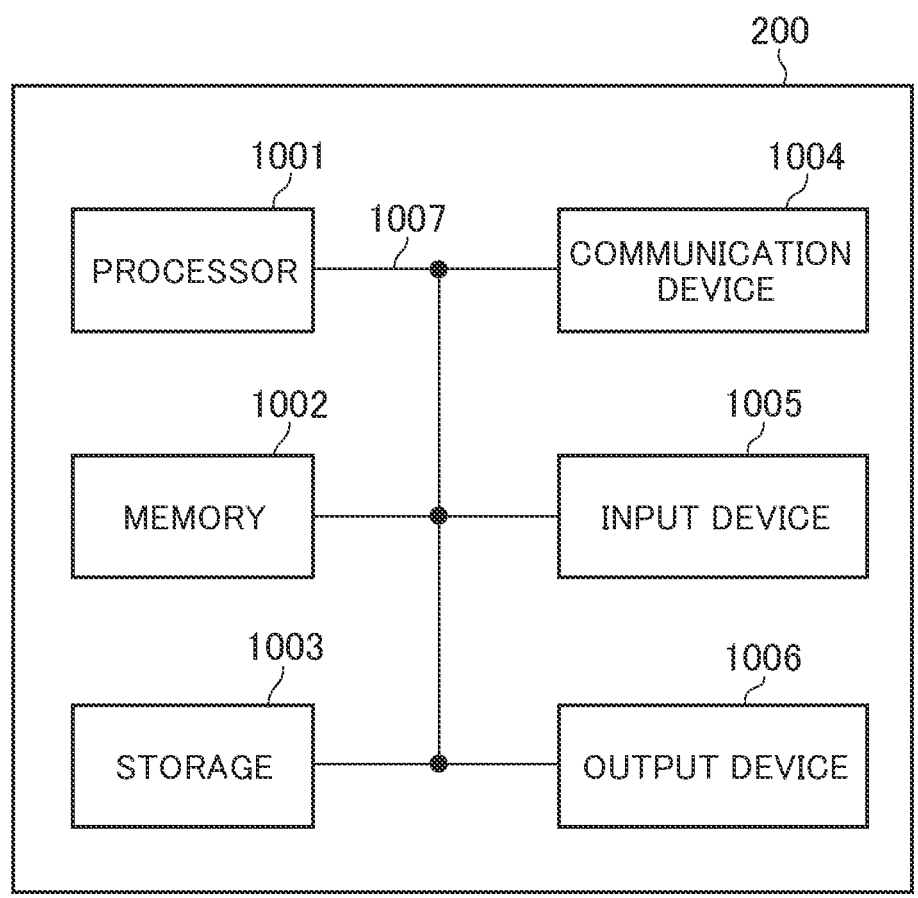
FIG. 13 is a diagram illustrating an example of a hardware configuration of the UE 200.

Furthermore, the UE 200 described above may function as a computer that performs the processing of the radio communication method of the present disclosure. FIG. 13 is a diagram illustrating an example of a hardware configuration of the UE 200. As illustrated in FIG. 13, the UE 200 may be configured as a computer device including a processor 1001, a memory 1002, a storage 1003, a communication device 1004, an input device 1005, an output device 1006, a bus 1007, and the like.

Furthermore, in the following description, the term "device" can be replaced with a term such as "circuit", "device", or "unit". A hardware configuration of the device may be constituted by including one or plurality of the devices illustrated in the figure, or may be constituted without including some of the devices.

Each functional block (see FIG. 4) of the UE 200 is realized by any of hardware elements of the computer device or a desired combination of the hardware elements.

Moreover, the processor 1001 performs operation by loading predetermined software (program) on hardware such as the processor 1001 and the memory 1002, controls communication via the communication device 1004, and controls at least one of reading and writing of data on the memory 1002 and the storage 1003, thereby realizing various functions of the UE 200.

The processor 1001, for example, operates an operating system to control the entire computer. The processor 1001 may be configured with a central processing unit (CPU) including an interface with a peripheral device, a control device, an operation device, a register, and the like.

Moreover, the processor 1001 reads a program (program code), a software module, data, and the like from at least one of the storage 1003 and the communication device 1004 into the memory 1002, and performs various processing according to the data. As the program, a program that is capable of executing on the computer at least a part of the operation described in the above embodiments is used. Alternatively, various processing described above can be performed by one processor 1001 or may be performed simultaneously or sequentially by two or more processors 1001. The processor 1001 may be implemented by using one or more chips. Alternatively, the program may be transmitted from a network via a telecommunication line.

The memory 1002 is a computer readable recording medium and may be configured, for example, with at least one of Read Only Memory (ROM), Erasable Programmable ROM (EPROM), Electrically Erasable Programmable ROM (EEPROM), Random Access Memory (RAM), and the like. The memory 1002 may be called register, cache, main memory (main storage device), and the like. The memory 1002 can store therein a program (program codes), software modules, and the like that can execute the method according to the embodiment of the present disclosure.

The storage 1003 is a computer readable recording medium. Examples of the storage 1003 include at least one of an optical disk such as Compact Disc ROM (CD-ROM), a hard disk drive, a flexible disk, a magneto-optical disk (for example, a compact disk, a digital versatile disk, or a Blu-ray (Registered Trademark) disk), a smart card, a flash memory (for example, a card, a stick, or a key drive), a floppy (Registered Trademark) disk, a magnetic strip, and the like. The storage 1003 may be called an auxiliary storage device. The recording medium may be, for example, a database including at least one of the memory 1002 and the storage 1003, a server, or other appropriate media.

The communication device 1004 is hardware (transmission/reception device) capable of performing communication between computers via at least one of a wired network and radio network. The communication device 1004 is also called, for example, a network device, a network controller, a network card, a communication module, or the like.

The communication device 1004 mat include a radio-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information thereamong. The bus 1007 may be constituted by a single bus or may be constituted by separate buses between the devices.

Further, the device may be configured to include hardware such as a microprocessor, a Digital Signal Processor (DSP), an Application Specific Integrated Circuit (ASIC), a Programmable Logic Device (PLD), and a Field Programmable Gate Array (FPGA). Some or all of these functional blocks may be realized by the hardware. For example, the processor 1001 may be implemented by using at least one of these kinds of hardware.

Notification of information is not limited to that described in the above aspect/embodiment, and may be performed by using a different method. For example, the notification of information may be performed by physical layer signaling (for example, Downlink Control Information (DCI), Uplink Control Information (UCI), higher layer signaling (for example, RRC signaling, Medium Access Control (MAC) signaling, broadcast information (Master Information Block (MIB) and System Information Block (SIB)), other signals, or a combination thereof. The RRC signaling may be called RRC message, and may be, for example, an RRC Connection Setup message or an RRC Connection Reconfiguration message.

Each of the above aspects/embodiments may be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods described above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal can be performed by at least one of the base station and other network nodes other than the base station (for example, MME, S-GW, and the like may be considered, but not limited thereto). In the above, an example in which there is one network node other than the base station is described; however, a combination of a plurality of other network nodes (for example, MME and S-GW) may be used.

Information and signals (information and the like) can be output from a higher layer (or lower layer) to a lower layer (or higher layer). It may be input and output via a plurality of network nodes.

The input/output information may be stored in a specific location (for example, a memory) or may be managed in a management table. The information to be input/output can be overwritten, updated, or added. The information may be deleted after outputting. The inputted information may be transmitted to another device.

The determination may be made by a value (0 or 1) represented by one bit or by a Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") not limited to being performed explicitly, and it may be performed implicitly (for example, without notifying the predetermined information).

Instead of being referred to as software, firmware, middleware, microcode, hardware description language, or some other names, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when software is transmitted from a website, a server, or some other remote sources by using at least one of a wired technology (coaxial cable, optical fiber cable, twisted pair, Digital Subscriber Line (DSL), or the like) and a radio technology (infrared light, microwave, or the like), at least one of these wired and radio technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in the present disclosure and terms necessary for understanding the present disclosure may be replaced by terms having the same or similar meanings. For example, at least one of a channel and a symbol may be a signal (signaling). Also, a signal may be a message. Further, a component carrier (CC) may be referred to as a carrier frequency, a cell, a frequency carrier, or the like.

The terms "system" and "network" used in the present disclosure are used interchangeably.

Furthermore, the information, the parameter, and the like described in the present disclosure may be represented by an absolute value, may be expressed as a relative value from a predetermined value, or may be represented by corresponding other information. For example, the radio resource may be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information elements can be identified by any suitable name, the various names assigned to these various channels and information elements shall not be restricted in any way.

In the present disclosure, it is assumed that "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, a communication service can be provided by a base station subsystem (for example, a small base station for indoor use (Remote Radio Head: RRH)).

The term "cell" or "sector" refers to a part or all of the coverage area of at least one of a base station and a base station subsystem that performs the communication service in this coverage.

In the present disclosure, the terms "mobile station (MS)", "user terminal", "user equipment (UE)", "terminal" and the like can be used interchangeably.

The mobile station may be called by those skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable terms.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), or a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same apples). For example, each of the aspects/embodiments of the present disclosure may be applied to a configuration that allows communication between a base station and a mobile station to be replaced with communication between a plurality of mobile stations (which may be referred to as, for example, Device-to-Device (D2D) or Vehicle-to-Everything (V2X)). In this case, the mobile station may have the function of the base station. Words such as "uplink" and "downlink" may also be replaced with wording corresponding to inter-terminal communication (for example, "side"). For example, terms such as an uplink channel, a downlink channel, or the like may be read as a side channel.

Likewise, a mobile station in the present disclosure may be read as a base station. In this case, the base station may have the function of the mobile station.

A radio frame may be configured with one or more frames in time domain. Each of one or more frames in the time domain may also be referred to as a subframe.

The subframe may be configured with one or more slots in the time domain. The subframe may be a fixed time length. (for example, 1 ms) that does not depend on numerology.

The numerology may be a communication parameter applied to at least one of transmission or reception of a certain signal or channel. The numerology may represent, for example, at least one of a subcarrier spacing (SCS), a bandwidth, a symbol length, a cyclic prefix length, a Transmission Time Interval (TTI), the number of symbols per TTI, a radio frame configuration, specific filtering processing performed by a transceiver in frequency domain, or specific windowing processing performed by the transceiver in the time domain.

The slot may be configured with one or more symbols (Orthogonal Frequency Division Multiplexing (OFDM) symbols, Single Carrier Frequency Division Multiple Access (SC-FDMA) symbols, and the like) in the time domain. The slot may be a unit of time based on the numerology.

The slot may include a plurality of minislots. Each minislot may be configured with one or more symbols in the time domain. Further, the minislot may also be called a subslot. The minislot may be configured with fewer symbols than those of slots. A PDSCH (or PUSCH) transmitted in a time unit larger than the minislot may be called a PDSCH (or PUSCH) mapping type A. A PDSCH (or PUSCH) transmitted using the minislot may be called a PDSCH (or PUSCH) mapping type B.

Each of the radio frame, subframe, slot, minislot, and symbol represents a time unit for transmitting a signal. Different names may be used for the radio frame, subframe, slot, minislot, and symbol, respectively.

For example, one subframe may be called a transmission time interval (TTI), a plurality of consecutive subframes may be called a TTI, and one slot or one minislot may be called a TTI. That is, at least one of the subframe or the TTI may be a subframe (1 ms) in the existing LTE, a period shorter than 1 ms (for example, 1 to 13 symbols), or a period longer than 1 ms. Note that a unit representing the TTI may also be called a slot, a minislot, or the like, instead of a subframe.

Here, the TTI refers to a minimum time unit of scheduling in radio communication, for example. For example, in the LTE system, a base station performs scheduling to allocate radio resources (frequency bandwidth, transmission power, or the like that can be used in each user terminal) to each user terminal in units of TTI. Note that the definition of the TTI is not limited thereto.

The TTI may be a transmission time unit such as a channel-coded data packet (transport block), a code block, or a codeword, or may be a processing unit such as scheduling or link adaptation. Note that, when a TTI is given, a time interval (for example, the number of symbols) in which a transport block, a code block, a codeword, or the like is actually mapped may be shorter than the TTI.

Note that, in a case where one slot or one minislot is called a TTI, one or more TTIs (that is, one or more slots or one or more minislots) may be a minimum time unit of scheduling. Further, the number of slots (the number of minislots) constituting the minimum time unit of the scheduling may be controlled.

A TTI having a time length of 1 ms may be called a normal TTI (TTI in LTE Rel. 8 to 12), a normal TTI, a long TTI, a normal subframe, a long subframe, a slot, or the like. A TTI shorter than the normal TTI may be called a short TTI, a short TTI, a partial or fractional TTI, a short subframe, a short subframe, a minislot, a subslot, a slot, or the like.

Note that the long TTI (for example, the normal TTI or the subframe) may be read as a TTI having a time length exceeding 1 ms, and the short TTI (for example, the short TTI) may be read as a TTI having a TTI length of less than the TTI length of the long TTI and equal to or more than 1 ms.

The resource block is a resource allocation unit in the time domain and the frequency domain, and may include one or a plurality of consecutive subcarriers in the frequency domain. The number of subcarriers included in the RB may be the same regardless of the numerology, for example, twelve. The number of subcarriers included in the RB may be determined based on the numerology.

Further, the time domain of the RB may include one or a plurality of symbols, and may have a length of one slot, one minislot, one subframe, or one TTI. One TTI, one subframe, or the like may be configured with one or a plurality of resource blocks.

Note that one or a plurality of RBs may also be called physical resource blocks (PRB), subcarrier groups (SCG), resource element groups (REG), PRB pairs, RB pairs, or the like.

Further, the resource block may also be configured with one or a plurality of resource elements (RE). For example, one RE may be a radio resource region of one subcarrier and one symbol.

The bandwidth part (BWP) (which may also be called a partial bandwidth, or the like) may represent a certain subset of continuous common resource blocks (RBs) for the numerology in a certain carrier. Here, the common RB may be specified by an RB index based on a common reference point of the carrier. The PRB may be defined in a certain BWP and numbered within the BWP.

The BWP may include a BWP (UL BWP) for UL and a BWP (DL BWP) for DL. One or a plurality of BWPs may be configured in one carrier for a UE.

At least one of the configured BWPs may be active, and the UE does not have to expect to transmit and receive a predetermined signal/channel outside the active BWP. Note that "cell", "carrier", and the like in the present disclosure may be read as "BWP".

The above-described structures such as a radio frame, a subframe, a slot, a minislot, and a symbol are merely examples. For example, the configuration such as the number of subframes included in a radio frame, the number of slots per subframe or radio frame, the number of minislots included in a slot, the number of symbols and RBs included in a slot or minislot, the number of subcarriers included in an RB, the number of symbols in a TTI, a symbol length, and a cyclic prefix (CP) length can be variously changed.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using at least one of one or more wires, cables, and printed electrical connections, and as some non-limiting and non-exhaustive examples, by using electromagnetic energy having wavelength in the radio frequency domain, the microwave region, and the light (both visible and invisible) region, and the like.

The reference signal may be abbreviated as RS and may be called pilot according to applicable standards.

As used in the present disclosure, the phrase "based on" does not mean "based only on" unless explicitly stated otherwise. In other words, the phrase "based on" means both "based only on" and "based at least on".

A term "means" in the configuration of each device described above may be replaced with a term such as "unit", "circuit", or "device".

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in any other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout the present disclosure, for example, during translation, if articles such as "a", "an", and "the" in English are added, in the present disclosure, these articles may include a plurality of nouns following these articles.

The term "determining" used in the present disclosure may encompass a wide variety or operations. The term "determining" can include, for example, judging, calculating, computing, processing, deriving, investigating, looking up, search, inquiry (for example, searching in a table, database, or other data structure), and ascertaining. In addition, "determining" can include receiving (for example, receiving information), transmitting (for example, transmitting information), inputting, outputting, and accessing (for example, accessing data in a memory), and the like. In addition, "determining" can include "resolving", "selecting", "choosing", "establishing", "comparing", and the like. In other words, the term "determining" can include any operation. Further, the term "determining" may also be read as "assuming", "expecting", "considering", and the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in the present disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

REFERENCE SIGNS LIST

10 Radio communication system
20 NG-RAN
100 gNB
200 UE
210 Radio signal transmitting/receiving unit
220 Amplifying unit
230 Modulation/demodulation unit
240 Control signal/reference signal processing unit
250 Coding/decoding unit
260 Data transmitting/receiving unit
270 Control unit
1001 Processor
1002 Memory
1003 Storage
1004 Communication device
1005 Input device
1006 Output device
1007 Bus

The invention claimed is:

1. A terminal comprising:

a processor that applies, in a case of using a first frequency band that is higher than a second frequency band in frequency, initial access configurations including a format of an initial access signal, the format being different from that for the second frequency band; and a transmitter that transmits the initial access signal via an initial access channel set based on the initial access configurations, wherein the processor applies the initial access configurations in which a maximum slot number associated with the format is increased as a subcarrier spacing is increased, and wherein the processor applies the initial access configurations in which a number of resource blocks in frequency domain for the initial access signal is decreased as the subcarrier spacing is increased.

2. The terminal according to claim 1, wherein the processor applies the initial access configurations in which a duration of the initial access channel including a beam switching time is specified.

3. The terminal according to claim 1, wherein the processor applies the initial access configurations in which a beam switching time is provided.

4. The terminal according to claim 1, wherein the processor assumes a minimum subcarrier spacing for the first frequency band in a case where the initial access configurations are associated with a plurality of subcarrier spacings.

* * * * *